(12) United States Patent
Miyazawa

(10) Patent No.: US 7,956,932 B2
(45) Date of Patent: Jun. 7, 2011

(54) IMAGE SIGNAL PROCESSING APPARATUS, METHOD OF CONTROLLING THE SAME, AND TELEVISION SIGNAL RECEIVING APPARATUS

(75) Inventor: Hirotoshi Miyazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/687,043

(22) Filed: Jan. 13, 2010

(65) Prior Publication Data

US 2010/0214478 A1 Aug. 26, 2010

(30) Foreign Application Priority Data

Feb. 26, 2009 (JP) ................................ 2009-044004

(51) Int. Cl.
*H04N 5/21* (2006.01)
*H04N 5/14* (2006.01)
*G06K 9/00* (2006.01)

(52) U.S. Cl. .......................... 348/672; 348/625; 382/169

(58) Field of Classification Search .................. 348/553, 348/625, 672, 700; 382/169; 358/522
See application file for complete search history.

(56) References Cited

U.S. PATENT DOCUMENTS

| | | | | |
|---|---|---|---|---|
| 5,450,502 | A * | 9/1995 | Eschbach et al. | 382/169 |
| 5,963,665 | A * | 10/1999 | Kim et al. | 382/169 |
| 6,018,588 | A * | 1/2000 | Kim | 382/167 |
| 6,266,102 | B1 * | 7/2001 | Azuma et al. | 348/671 |
| 6,373,533 | B1 * | 4/2002 | Kawabata et al. | 348/672 |
| 6,493,042 | B1 * | 12/2002 | Bozdagi et al. | 348/700 |
| 6,661,917 | B1 * | 12/2003 | Nagakubo et al. | 382/169 |
| 6,700,628 | B1 * | 3/2004 | Kim | 348/687 |
| 6,885,477 | B2 * | 4/2005 | Karidi et al. | 358/3.27 |
| 7,042,525 | B1 | 5/2006 | Yu | |
| 7,245,764 | B2 * | 7/2007 | Nishizawa | 382/168 |
| 7,248,743 | B2 * | 7/2007 | Murakami | 382/251 |
| 7,359,573 | B2 * | 4/2008 | Park et al. | 382/274 |
| 7,839,455 | B2 * | 11/2010 | Harada | 348/672 |
| 7,859,721 | B2 * | 12/2010 | Borg | 358/1.9 |
| 2005/0031201 | A1 * | 2/2005 | Goh | 382/169 |
| 2006/0083425 | A1 | 4/2006 | Moldvai | |
| 2007/0216956 | A1 * | 9/2007 | Hsieh et al. | 358/3.21 |

(Continued)

FOREIGN PATENT DOCUMENTS

JP 09-182019 11/1997

(Continued)

OTHER PUBLICATIONS

Japanese Office Action dated May 7, 2010 for application No. JP 2009-044004 (U.S. Appl. No. 12/687,043). (English Translation).

*Primary Examiner* — Brian Yenke
(74) *Attorney, Agent, or Firm* — Blakely, Sokoloff, Taylor & Zafman LLP

(57) ABSTRACT

According to one embodiment of the invention, a smoothing module is configured to smooth and reduce grayscale differences in a plain area of an input digital image signal according to a collection parameter. A histogram acquisition module is configured to acquire a histogram value of the input digital image signal for one frame. A histogram value buffer module is configured to buffer histogram values for a plurality of frames. A luminance level transition detection module is configured to detect an interval during which an image gradually changes from light to dark or from dark to light, based on the histogram values for a plurality of frames, and to output the correction parameter.

7 Claims, 8 Drawing Sheets

U.S. PATENT DOCUMENTS

| | | |
|---|---|---|
| 2008/0030450 A1* | 2/2008 | Yamagishi et al. ............ 345/89 |
| 2008/0152223 A1 | 6/2008 | Maeda |
| 2008/0181492 A1* | 7/2008 | Abe et al. .................... 382/165 |
| 2008/0298685 A1 | 12/2008 | Maeda |
| 2009/0060277 A1* | 3/2009 | Zhang et al. ................. 382/103 |
| 2009/0136152 A1* | 5/2009 | Kameyama ................... 382/275 |
| 2009/0251399 A1* | 10/2009 | Kim .............................. 345/89 |
| 2010/0214486 A1* | 8/2010 | Sasaki ........................... 348/607 |
| 2010/0321581 A1* | 12/2010 | Iwakura et al. .............. 348/687 |

FOREIGN PATENT DOCUMENTS

| | | |
|---|---|---|
| JP | 2002-083294 | 3/2002 |
| JP | 2002-133420 | 5/2002 |
| JP | 2006-121274 | 5/2006 |
| JP | 2006-140995 | 6/2006 |
| JP | 2008-160440 | 7/2008 |
| JP | 2008-160417 | 10/2008 |
| JP | 2008-300980 | 12/2008 |

* cited by examiner

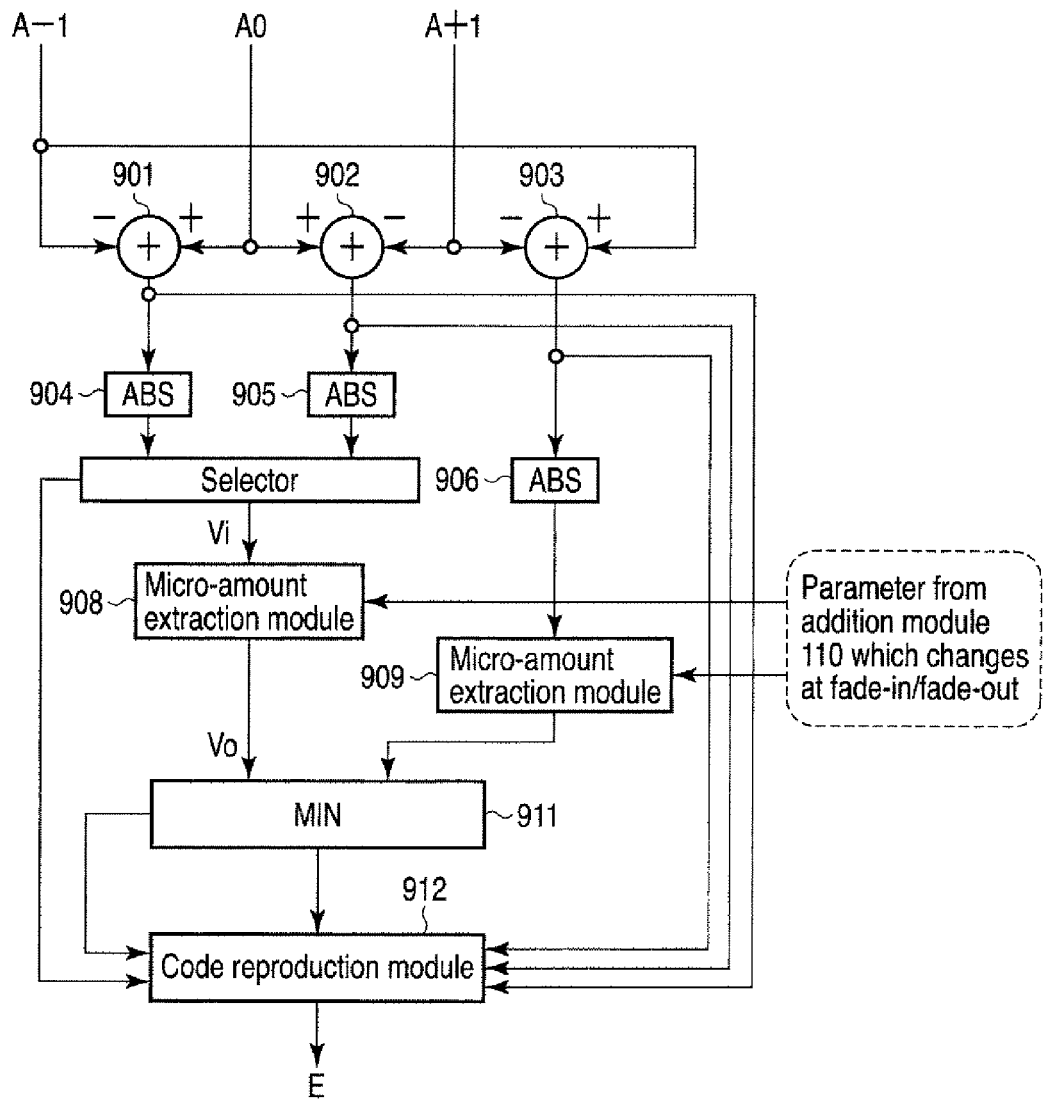
F I G. 8

IMAGE SIGNAL PROCESSING APPARATUS, METHOD OF CONTROLLING THE SAME, AND TELEVISION SIGNAL RECEIVING APPARATUS

CROSS-REFERENCE TO RELATED APPLICATIONS

This application is based upon and claims the benefit of priority from Japanese Patent Application No. 2009-044004, filed Feb. 26, 2009, the entire contents of which are incorporated herein by reference.

BACKGROUND

1. Field

One embodiment of the invention relates to an image signal processing apparatus, a method of controlling the image signal processing apparatus, and a television signal receiving apparatus that gets an improvement in image quality at fade-in/fade-out, for example.

2. Description of the Related Art

In recent years, in digital image signal recording/reproducing apparatuses and digital image signal sending/receiving apparatuses, compression and encoding/decoding processes have been performed on digital image signals. For compression and encoding/decoding schemes for digital image signals, the Moving Picture Experts Group (MPEG)-2 scheme, for example, is known.

It is known that when a digital image signal compressed and encoded by the MPEG-2 scheme is decoded, block noise occurs. The block noise is noticeable in a plain area of an image as a luminance difference.

There are techniques related to image processing and image processing methods that perform a smoothing process on an image signal to reduce such noise (e.g., Jpn. Pat. Appln. KOKAI Publication No. 2008-160440).

An image signal processing apparatus which adopts the above-described smoothing processing technique can reduce luminance differences in a plain area of an image. However, when input image signals have various characteristics or properties, such an apparatus is not always effective for all of the input image signals.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 8 is a module diagram showing an exemplary configuration of a micro-change detection module in FIG. 7;

DETAILED DESCRIPTION

Various embodiments according to the invention will be described hereinafter with reference to the accompanying drawings.

In an aspect of the present invention, an image signal processing apparatus, a method of controlling the image signal processing apparatus, and a television signal receiving apparatus are provided that allow a smoothing module to effectively reduce noise (e.g., grayscale stripes) particularly in the case of a digital image signal that gradually changes from light to dark or from dark to light, such as at fade-in/fade-out.

In one embodiment of the present invention, a smoothing module is provided which is configured to smooth and reduce grayscale differences in a plain area of an input digital image signal. A histogram acquisition module is configured to acquire a histogram value of the input digital image signal for one frame. A histogram value buffer module is configured to buffer histogram values for a plurality of frames, the histogram value from the histogram acquisition module being input to the histogram value buffer module. A luminance level transition detection module is configured to detect an interval during which an image gradually changes from light to dark or from dark to light, based on the histogram values for a plurality frames, and to output a correction parameter during the interval, the correction parameter enhancing an effect of smoothing and reducing the grayscale differences in the plain area. A correction module is configured to provide a parameter to the smoothing module to smooth and reduce the grayscale differences, the parameter being obtained by adding the correction parameter to an initial parameter.

According to the one embodiment of the present invention, an effect of being able to reduce noticeability of a grayscale stripe pattern during an interval during which a gradual change from light to dark or from dark to light is made, such as at fade-in/fade-out, is obtained.

More specific description will be made below.

Figure 1:
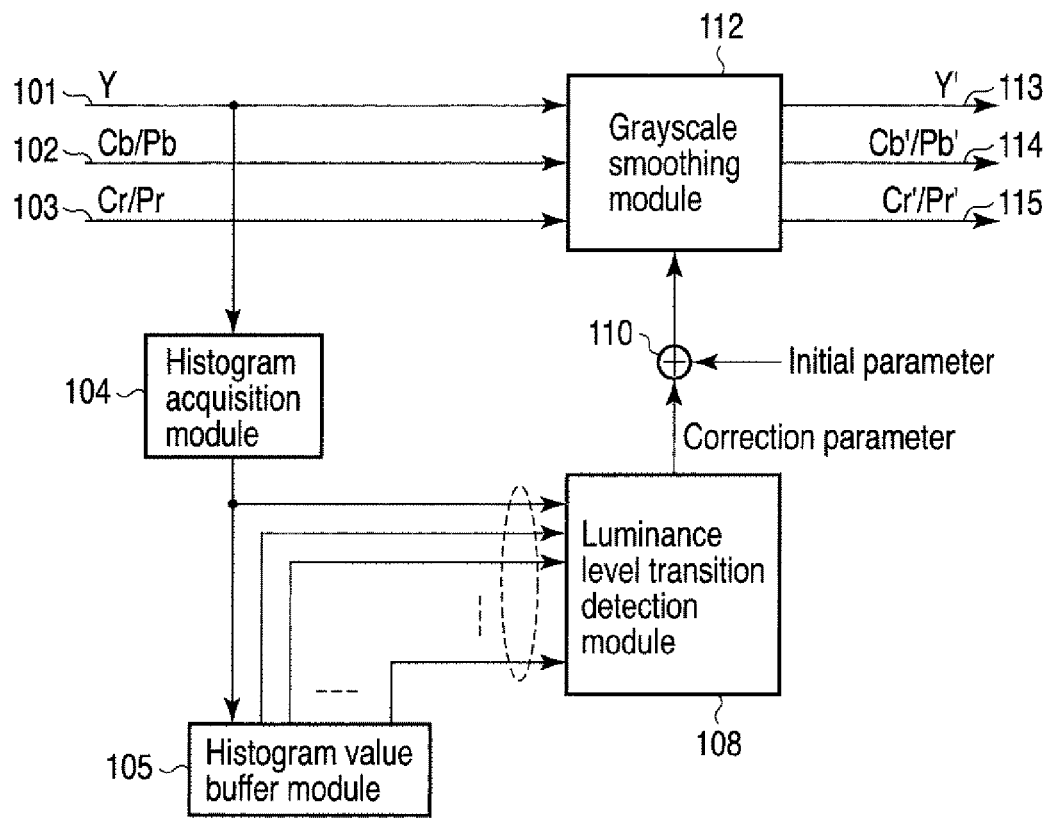
FIG. 1 an illustrative diagram of a configuration of an image signal processing apparatus according to one embodiment of the present invention.

FIG. 1 shows one embodiment of the present invention. A digital luminance signal Y is input to an input terminal 101, a color difference signal Cb or Pb is input to an input terminal 102, and a color difference signal Cr or Pr is input to an input terminal 103. A grayscale smoothing module 112 performs a smoothing process on grayscale differences made in a plain area of the luminance signal Y and the color difference signals Cb/Pb or Cr/Pr. The smoothing process is particularly effective for block noise. The configuration and operations of the grayscale smoothing module 112 will be described in more detail later.

Figure 2:
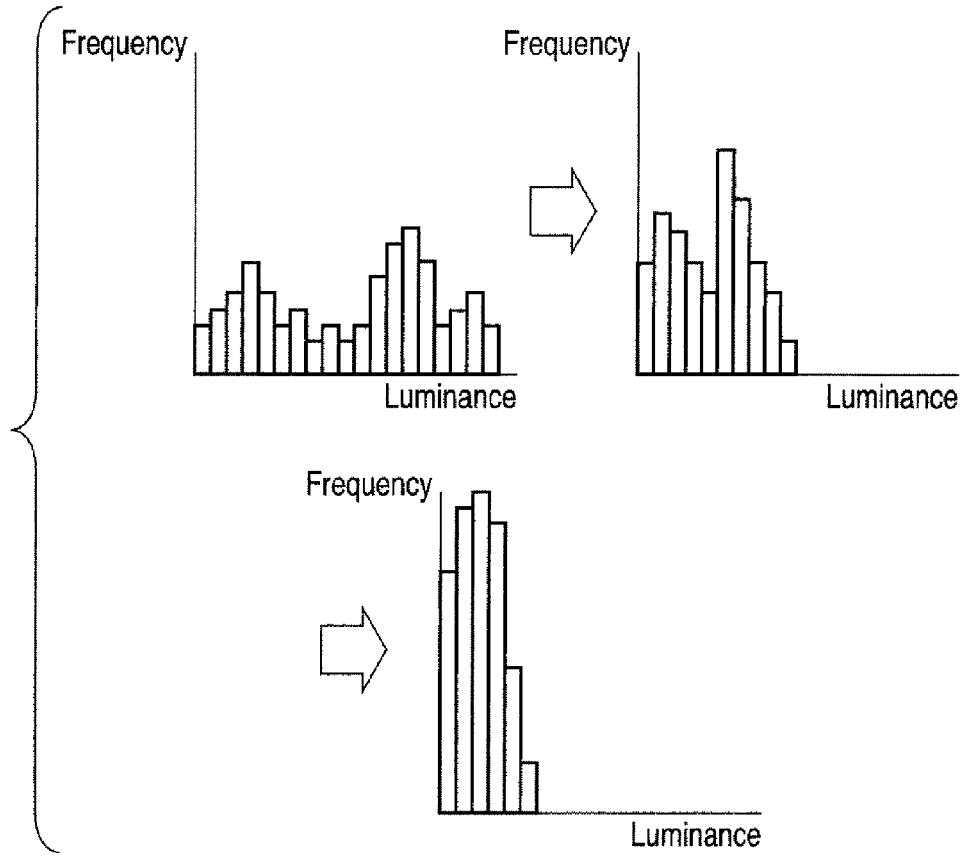
FIG. 2 is an illustrative diagram showing exemplary histograms of a luminance signal which are acquired by a histogram acquisition module in FIG. 1.

The luminance signal Y is input to a histogram acquisition module 104. The histogram acquisition module 104 acquires a histogram distribution of an input digital image signal for each frame. Histogram distributions shown in FIG. 2 show a state for when the histogram acquisition module 104 acquires histogram distributions one after another. The histograms in FIG. 2 respectively show, from left, an Nth frame, an N+1th frame, an N+2th frame, . . . .

In the histogram acquisition module 104, a frequency of each level in an acquired histogram distribution is multiplied by a weighting factor set for each level. Thereafter, the sum of the frequencies of all levels is acquired and the acquired sum is output to a histogram value buffer module 105 as a computation value (hereinafter, referred to as the histogram value) for the current frame.

Figure 3:
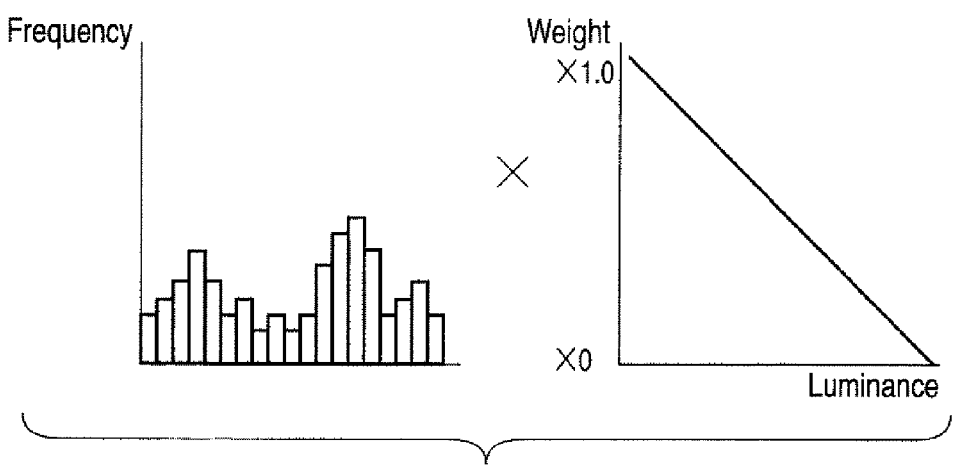
FIG. 3 is an illustrative diagram showing an example of weights assigned to a histogram value by the histogram acquisition module in FIG. 1.

FIG. 3 shows the characteristic of weighting factors which are used to assign weights to a histogram distribution. As can be seen from the drawing, the lower the value of the luminance level, the larger the value of the weighting factor. This is due to the fact that at fade-in/fade-out a stripe pattern caused by grayscale differences in a plain area is more noticeable in areas with low luminance levels. That is, since a stripe pattern caused by grayscale differences in a plain area is more noticeable on a darker screen, the histogram value is enhanced more as the screen gets darker.

Furthermore, since in the above-described weighting factor characteristic the number of factor values is smaller at higher luminance levels, the amount of data is reduced for a lighter screen. Also, this fact results in a reduction in load on a data computation process.

The histogram value output from the histogram acquisition module 104 is taken in the histogram value buffer module 105. The histogram value buffer module 105 buffers histograms for a plurality of frames.

The histogram values for the respective frames accumulated in the histogram value buffer module 105 are taken in a luminance level transition detection module 108 to detect a fade-in or fade-out interval. A fade-in or fade-out interval can be determined by taking differences in histogram value between several frames to determine whether the same polarity (positive or negative) continues. When the luminance level transition detection module 108 detects a fade-in or fade-out interval, the luminance level transition detection module 108 outputs a correction parameter during the interval according to the slope of a luminance change and supplies the correction parameter to an addition module 110 serving as a correction module.

In this case, the luminance level transition detection module 108 makes a modification to the correction parameter so as to prevent occurrence of sudden or frequent parameter changes. This operation will be further described later.

The addition module 110 adds the correction parameter to, for example, a standard value set by an apparatus manufacturer or user set value determined by user's preference (hereinafter, referred to as the initial parameter) and supplies the resulting parameter to the grayscale smoothing module 112. As a result, the grayscale smoothing module 112 increases in its sensitivity at fade-in/fade-out and thus operates so as to reduce differences in grayscale level in a plain area.

Figure 4:
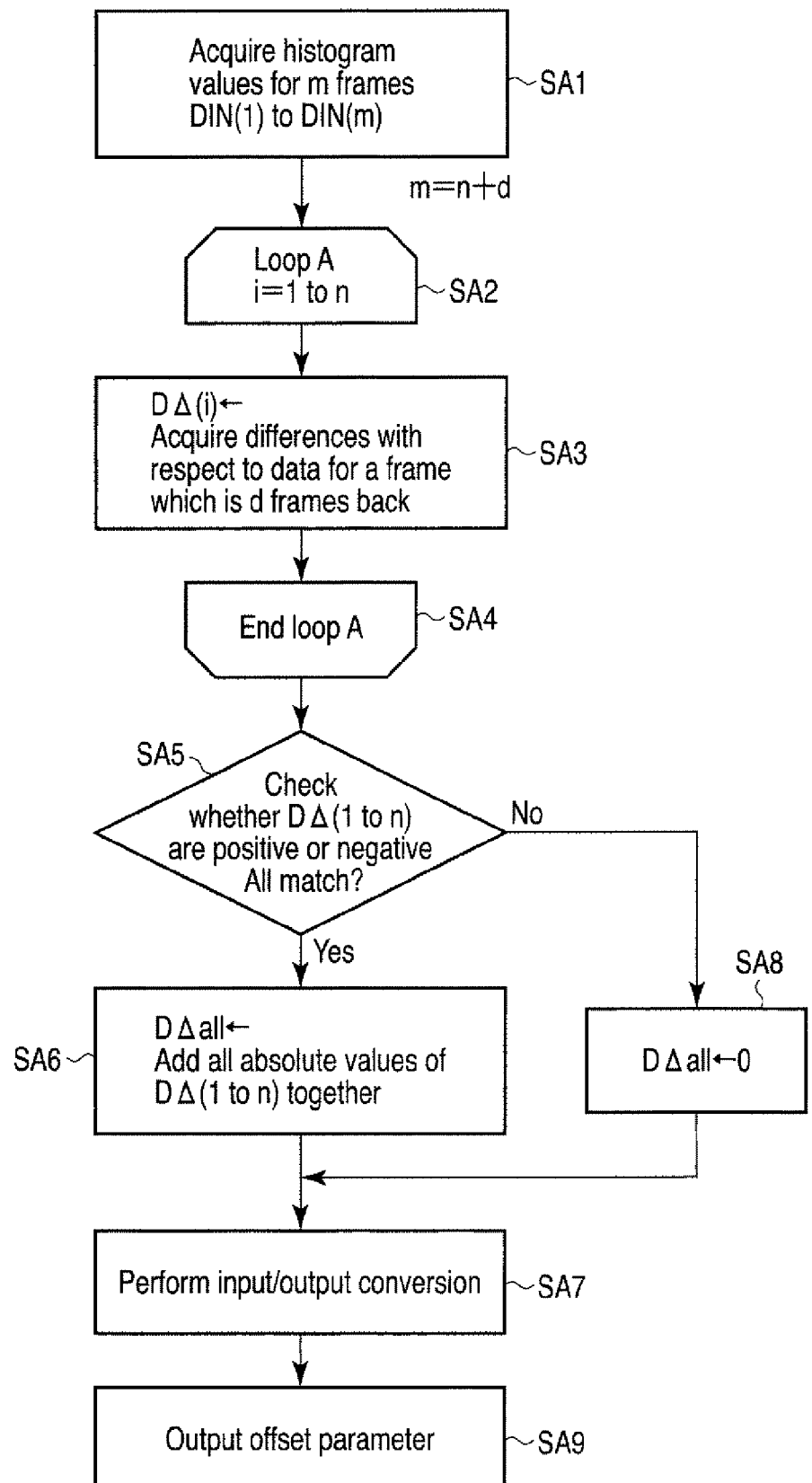
FIG. 4 is a block diagram of an operation procedure shown to describe operations of the apparatus in FIG. 1.

FIG. 4 is a block diagram of an operation procedure shown to describe operations of the apparatus in FIG. 1. In step SA1, histogram values (DIN(1) to DIN(m)) for m frames are acquired. Then, in steps SA2, SA3, and SA4, a difference value (DΔ(1 to n)) between a histogram value for each of frames (i=1) to (i=n) and a histogram value for a frame which is d frames back from the frame is acquired. Note that m=n+d or m>n+d.

Figure 5:
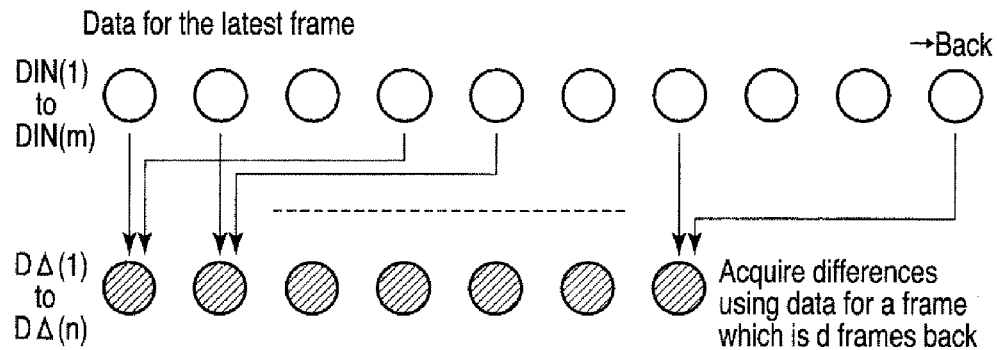
FIG. 5 is an illustrative diagram shown to describe operations in blocks SA2, SA3, and SA4 in FIG. 4.

FIG. 5 shows a state of acquiring the difference values (DΔ(1 to n)) using the buffered histogram values (DIN(1) to DIN(m)) for m frames and the histogram values for the frames (i=1) to (i=n).

The reason that a difference value between a frame and a frame which is d frames back from the frame is acquired is to avoid misoperations for when, for example, a 2-3 pulldown signal is processed. When a 24-frame-per-second movie film is converted into 60 Hz image data, an image of the same content is repeated in a pattern of 2-3-2-3- . . . . Hence, when a histogram value at a location spaced by, for example, three frames or more is used, a correct difference can be acquired without affected by the form of a 2-3 pulldown signal.

When the difference values (DΔ(1 to n)) are acquired, in step SA5 in FIG. 4, it is determined whether the polarities of the difference values continuously match one another. All of the polarities matching one another indicates that the screen continuously goes from light to dark (fade-out) or goes from dark to fight (fade-in) over several frames. At this time, absolute values of the difference values (DΔ(1 to n)) are all added together, the resulting value is subjected to input/output conversion (step SA7), and the converted value is output as a correction parameter (step SA9).

On the other hand, if, in step SA5, the polarities of the difference values are discontinuous, then the difference values (DΔ(1 to n)) are all converted to zero, the resulting value is subjected to input/output conversion (step SA7), and the converted value is output as a correction parameter (step SA9).

Figure 6:
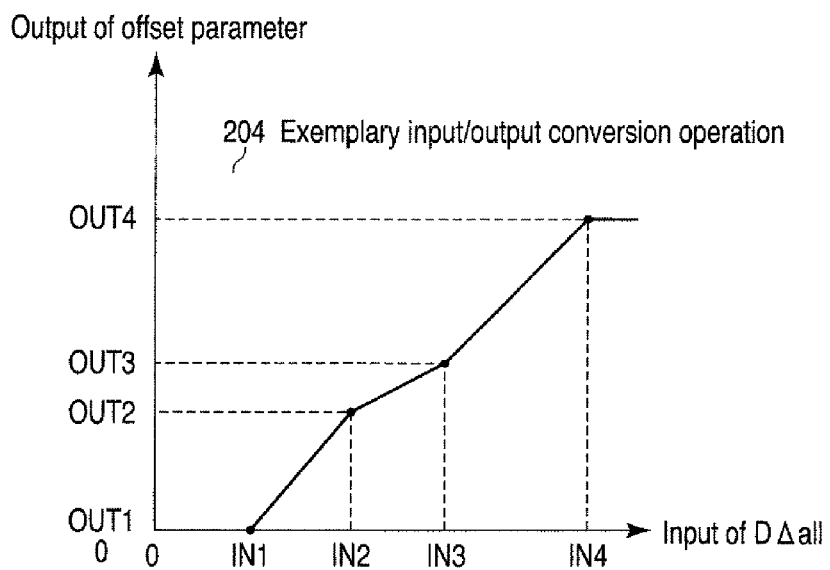
FIG. 6 is an illustrative diagram shown to describe an operation in block SA7 in FIG. 4.

An exemplary operation performed in the input/output conversion process in step SA7 is shown in FIG. 6. A conversion function with four input-output Thresh levels is used. A Thresh level of the value of an output OUT1 is set to an input IN1, a Thresh level of the value of an output OUT2 is set to an input IN2, a Thresh level of the value of an output OUT3 is set to an input IN3, and a Thresh level of the value of an output OUT4 is set to an input IN4. The input Thresh levels and output levels at a certain time can be freely set. For an input value such as that between the inputs IN1 and IN2, linear interpolation is performed and accordingly a value transitioning from the output OUT1 to the output OUT2 is output. When the input value is less than the input IN1, the output OUT1 is always output. When the input value is more than the input IN4, the output OUT4 is always output. A value obtained by the input/output conversion process (step SA7) is output to the addition module 110 as a correction parameter (offset) for a smoothing parameter. By this, when a state is considered to be fade-in/fade-out, the amount of change in smoothing parameter is determined according to how much change occurs in brightness.

The addition module 110 adds together an initial parameter used to perform an operation in a normal state and the correction parameter (offset) for a smoothing parameter and outputs the resulting parameter to the grayscale smoothing module 112 to set an enhancement level of a smoothing effect. An image signal having been subjected to a smoothing process by the grayscale smoothing module 112 is output as signals 113, 114, and 115.

Figure 7:
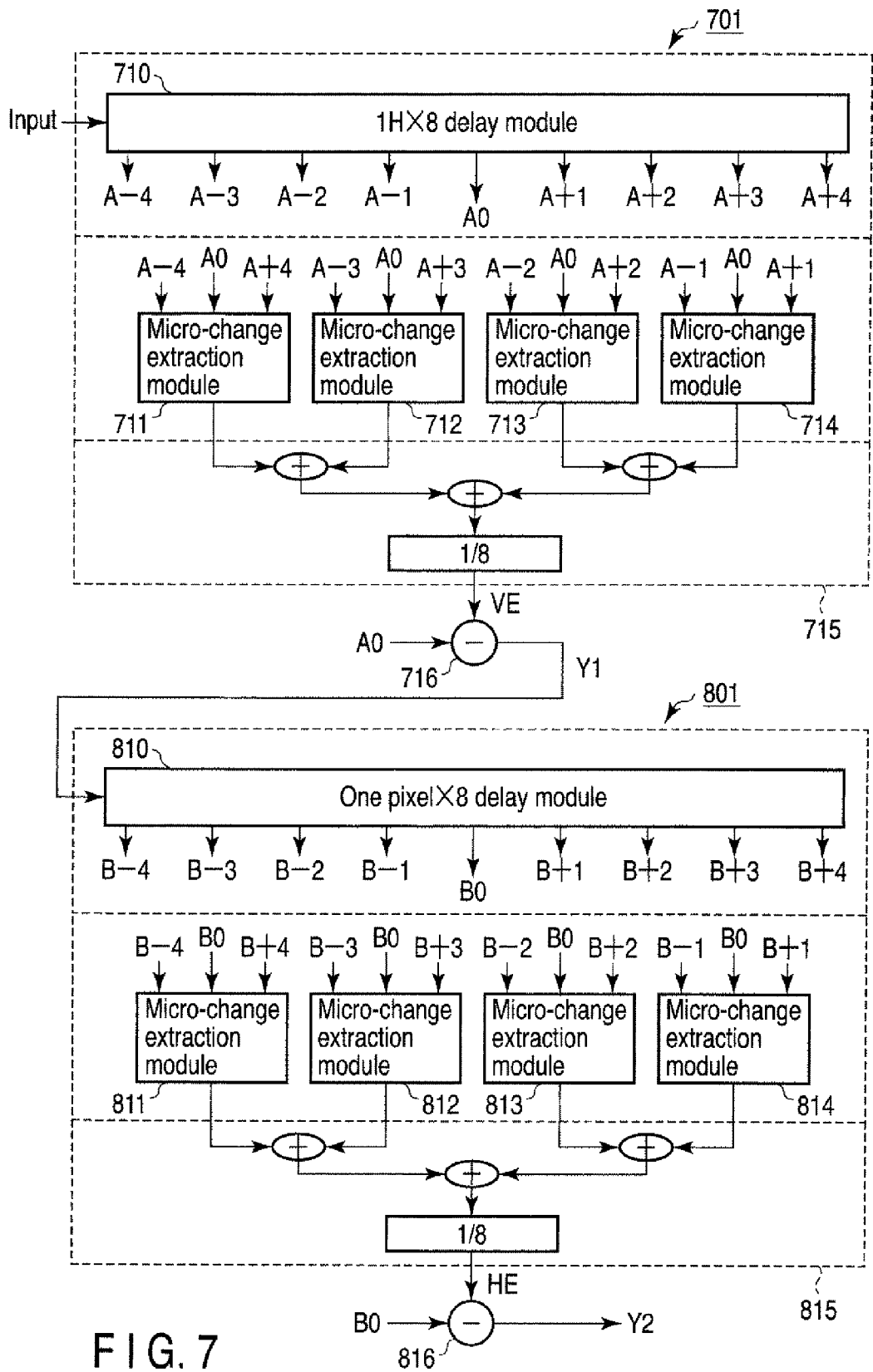
FIG. 7 is a module diagram showing an example of a grayscale smoothing module in FIG. 1.

FIG. 7 shows an example of the grayscale smoothing module 112. A grayscale smoothing module is independently prepared for each of the luminance signal Y and the color difference signals Cb/Pb and Cr/Pr but the drawing shows, as a representative example, a grayscale smoothing module for the luminance signal Y.

An input luminance signal Y is subjected to a smoothing process for its grayscale differences in the vertical direction by a vertical direction processing module 701 and is then subjected to a smoothing process for its grayscale differences in the horizontal direction by a horizontal direction processing module 801.

The vertical direction processing module 701 comprises, for example, a delay module 710 for eight lines, micro-change extraction modules 711, 712, 713, and 714, and an averaging module 715 which rounds outputs from the micro-change extraction modules 711 to 714. The horizontal direction processing module 801 comprises, for example, a delay module 810 for eight pixels, micro-change extraction modules 811, 812, 813, and 814, and an averaging module 815 which rounds outputs from the micro-change extraction modules 811 to 814.

Vertical modified data VE output from the averaging module 715 of the vertical direction processing module 701 is input to a subtractor 716. The subtractor 716 subtracts the modified data VE from central data A0 and thereby obtains an output luminance signal Y1 which is smoothed in the vertical direction. The luminance signal Y1 is input to the horizontal direction processing module 801 and supplied to a subtractor 816 as modified data HE for the horizontal direction. The subtractor 816 subtracts the modified data HE from central data B0 and thereby obtains an output luminance signal Y2.

In the vertical direction processing module 701, to the micro-change extraction module 711 are input central data A0 and data A+4 and data A−4 present at locations spaced from the central data A0 by four lines in the positive and negative directions. The micro-change extraction module 711 basically detects a difference between the central data A0 and data A+4 and a difference between the central data A0 and data A−4 to determine whether there are differences in grayscale between pixels, and extracts the smaller one of the differences. To the micro-change extraction module 712 are input central data A0 and data A+3 and data A−3 present at locations spaced from the central data A0 by three lines in the positive and negative directions. To the micro-change extraction module 713 are input central data A0 and data A+2 and data A−2 present at locations spaced from the central data A0 by two lines in the positive and negative directions. To the micro-change extraction module 714 are input central data A0 and data A+1 and data A−1 present at locations spaced from the central data A0 by one line in the positive and negative directions. Each of the micro-change extraction modules 712 to 714 also basically detects a difference between the central data A0 and one data and a difference between the central data A0 and the other data to determine whether there are differences in grayscale between pixels, and extracts the smaller one of the differences.

Outputs from the respective micro-change extraction modules 711 to 714 are added together by the averaging module 715 and an average value thereof is output as the foregoing modified data VE.

In the horizontal direction processing module 801, to the micro-change extraction module 811 are input central data B0 and data B+4 and data B−4 present at locations spaced from the central data B0 by four pixels in the positive and negative directions. The micro-change extraction module 811 basically detects a difference between the central data B0 and data B+4 and a difference between the central data B0 and data B−4 to determine whether there are differences in grayscale between pixels, and extracts the smaller one of the differences. To the micro-change extraction module 812 are input central data B0 and data B+3 and data B−3 present at locations spaced from the central data B0 by three pixels in the positive and negative directions. To the micro-change extraction module 813 are input central data B0 and data B+2 and data B−2 present at locations spaced from the central data B0 by two pixels in the positive and negative directions. To the micro-change extraction module 814 are input central data B0 and data B+1 and data B−1 present at locations spaced from the central data B0 by one pixel in the positive and negative directions. Each of the micro-change extraction modules 812 to 814 also basically detects a difference between the central data B0 and one data and a difference between the central data B0 and the other data to determine whether there are differences in grayscale between pixels, and extracts the smaller one of the differences.

Outputs from the respective micro-change extraction modules 811 to 814 are added together by the averaging module 815 and an average value thereof is output as the foregoing modified data HE.

The above-described process corresponds to detecting a change in grayscale in 8×8 pixel block units and performing, if there is a change in grayscale, a smoothing process so as to prevent the change from becoming noticeable. That is, block noise is reduced.

Here, parameters are provided to the micro-change extraction modules. FIG. 8 shows a representative exemplary configuration of one micro-change extraction module. To the micro-change extraction module are input central data A0 and data A+I and data A−I present at locations spaced from the central data A0 by I line(s) or pixel(s) in the positive and negative directions. I is any one of 1 to 4. A difference between data A0 and data A−I is computed by a subtractor 901 and converted to an absolute value by an absolute value module 904. Then, the absolute value is input to a selector 907. A difference between data A0 and data A+I is computed by a subtractor 902 and converted to an absolute value by an absolute value module 905. Then, the absolute value is input to the selector 907. The selector 907 selects the smaller one of the absolute values and supplies the selected absolute value to a micro-amount extraction module 908.

A difference between data A−I and data A+I is computed by a subtractor 903 and converted to an absolute value by an absolute value module 906. The absolute value is supplied to a micro-amount extraction module 909. The difference between data A−I and data A+I shows that the pixel level change increases or decreases as time elapses or there is no pixel level change.

The above-described detection form is considered to have the following patterns:

Pattern 1 . . . A−I<A0, A0<A+I, and A−I<A+I (increase with time)

Pattern 2 . . . A−I>A0, A0>A+I, and A−I>A+I (decrease with time)

Pattern 3 . . . A−I<A0, A0>A+I, and A−I=A+I (triangle)

Pattern 4 . . . A−I>A0, A0<A+I, and A−I=A+I (inverted triangle shape)

The input/output characteristics of the micro-amount extraction modules 908 and 909 are controlled by the aforementioned parameter from the addition module 110. Outputs from the micro-amount extraction modules 908 and 909 are input to a minimum value detection module 911 and the smaller one of the outputs is selected. The selected data is input to a code reproduction module 912 to reproduce code and the reproduced code is adopted as modified data.

Figure 9A:
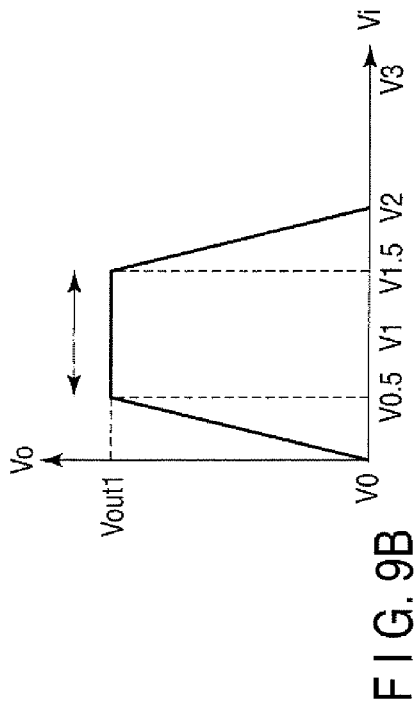
FIGS. 9A to 9C are diagrams showing examples of input/output characteristics of a micro-amount extraction module in the module in FIG. 8.

An initial state of the relationship between an input Vi and an output Vo of the micro-amount extraction modules 908 and 909 is set as shown in FIG. 9A, for example. First, while the value of the input Vi increases from zero to V1, the output Vo increases at a constant rate. When the value of the input Vi is between V1 and V2, the output Vo is kept at a constant value Vout1. Then, when the value of the input Vi exceeds V2, the output Vo changes in a direction in which the output Vo decreases.

As a result, a smoothing process effect is gradually enhanced until the value of the input Vi reaches V1, and the smoothing process effect is maintained (does not change) when the value of the input Vi is between V1 and V2, and the smoothing process effect is reduced when the value of the input Vi is V2 or more. The reason why Vout1 is kept constant when the value of the input Vi is between V1 and V2 is because when the smoothing process effect frequently changes, noise is more likely to occur. The reason why the characteristic is such that the smoothing process effect is reduced when the value of the input Vi is V2 or more is because a picture is highly likely to be different than an originally intended grayscale smoothing target picture.

Figure 9B:
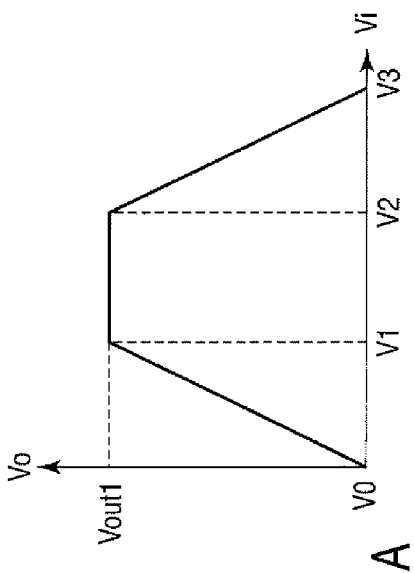
Figure 9C:
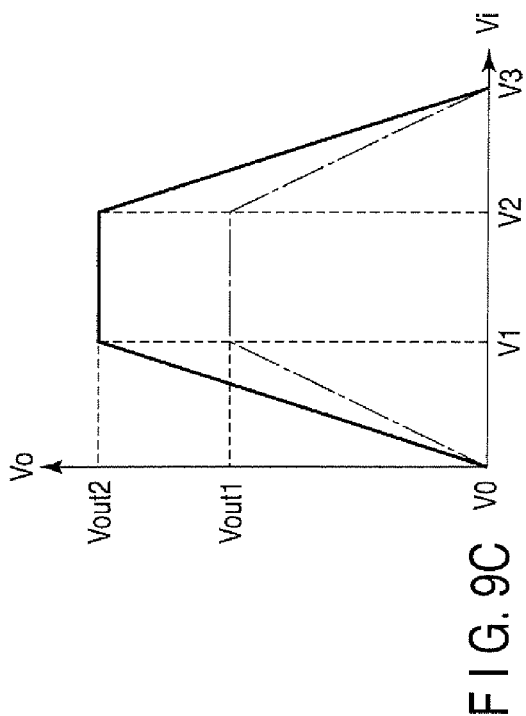

When the addition module 110 adds a correction parameter described in FIG. 1 to an initial parameter, the relationship between the input Vi and the output Vo of the micro-amount extraction modules 908 and 909 obtains a conversion characteristic such as that shown in FIG. 9B or 9C, for example. When the relationship has such a characteristic, sensitivity to a change of the output Vo with respect to the input Vi increases. Therefore, the grayscale smoothing module 112 shown in FIG. 1 increases in its sensitivity at fade-in/fade-out and thus operates so as to reduce differences in grayscale level in a plain area.

Figure 10:
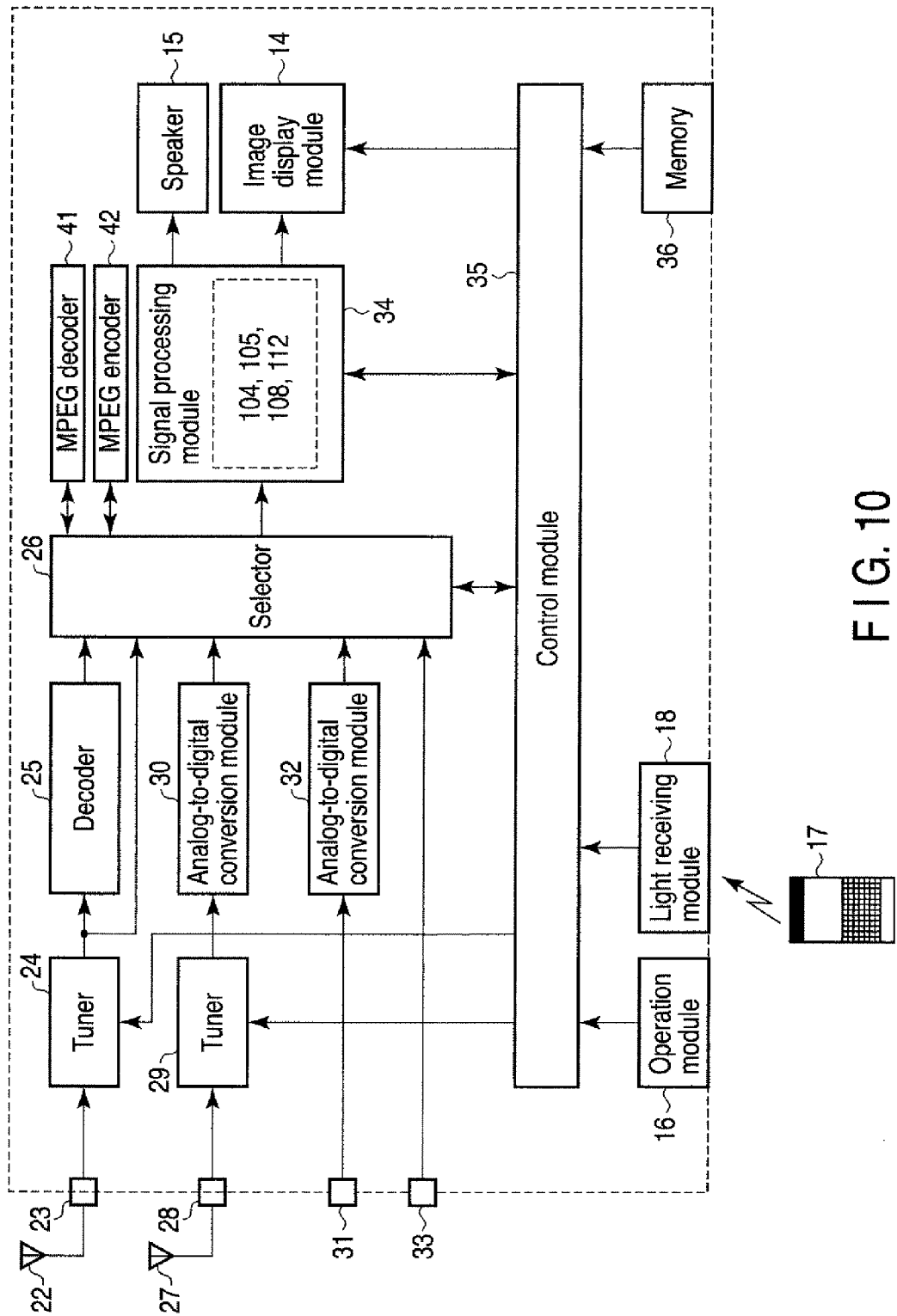
FIG. 10 is an overall block diagram of a digital television broadcast receiving apparatus to which the present invention is applied.

FIG. 10 schematically shows a signal processing system of a television signal receiving apparatus in which an image signal processing apparatus in the present invention is incorporated.

Main components of the image signal processing apparatus are incorporated in a signal processing module 34 and are controlled by a control module 35. A digital television broadcast signal received by an antenna 22 for receiving digital television broadcasts is supplied to a tuner 24 through an input terminal 23. The tuner 24 selects a signal of a desired channel from the input digital television broadcast signal and demodulates the signal. Then, the signal output from the tuner 24 is supplied to a decoder 25 and is subjected to a Moving Picture Experts Group (MPEG)-2 decoding process, together with, for example, an MPEG decoder 41.

The signal output from the tuner 24 is also directly supplied to a selector 26. It is also possible to demultiplex the signal into image and audio information, etc., and record the image and audio information in an HDD unit 20 through the control module 35.

Furthermore, an analog television broadcast signal received by an antenna 27 for receiving analog television broadcasts is supplied to a tuner 29 through an input terminal 28. The tuner 29 selects a signal of a desired channel from the input analog television broadcast signal and demodulates the signal. Then, the signal output from the tuner 29 is digitized by an analog-to-digital conversion module 30 and then the digital signal is output to the selector 26.

Also, analog image and audio signals supplied to an analog signal input terminal 31 are supplied to an analog-to-digital conversion module 32 and digitized and then the digital signals are output to the selector 26. Furthermore, digital image and audio signals supplied to a digital signal input terminal 33 are directly supplied to the selector 26.

When a digitized signal is recorded in, for example, a recording apparatus (not shown), the signal is subjected to a compression process using a predetermined format, e.g., the Moving Picture Experts Group (MPEG)-2 scheme, by an MPEG encoder 42 with which the selector 26 is accompanied and then the compressed signal is recorded in the recording apparatus.

The selector 26 selects one pair of digital image and audio signals from the input digital image and audio signals at four locations and supplies the selected pair of signals to the signal processing module 34. The signal processing module 34 performs predetermined signal processing on the input digital image signal to provide image display on an image display module 14. For the image display module 14, for example, a flat panel display configured by a liquid crystal display or plasma display is adopted. The signal processing module 34 also performs predetermined signal processing on the input digital audio signal to convert the signal to an analog signal and outputs the analog signal to a speaker 15, whereby audio playback is performed.

In the television signal receiving apparatus, overall control of various operations including the above-described various receiving operations is performed by the control module 35. The control module 35 is a microprocessor including a central processing unit (CPU), etc. Operation information from an operation module 16 or operator (not shown) or operation information sent from a remote control 17 is received by a light receiving module 18 and the control module 35 processes the received operation information and thereby controls each module such that the operation content is reflected.

In this case, the control module 35 uses a memory 36. The memory 36 mainly comprises a read-only memory (ROM) which stores a control program executed by the CPU; a random access memory (RAM) for providing the CPU with a work area; and a nonvolatile memory which stores various setting information, control information, etc.

In the above-described embodiment, as a matter of course, the grayscale smoothing module 112 includes a time adjustment buffer so that a period during which a correction parameter is provided to the addition module 110 is synchronized with a fade-in or fade-out interval.

Note that although in the above description the apparatus in the present invention operates at fade-in/fade-out, the operating time is not necessarily limited to an interval defined as fade-in/fade-out. As long as the interval is one during which a gradual change from light to dark or from dark to light is made, the apparatus in the present invention, as a matter of course, smoothes differences in grayscale level. Also, although the above description shows a processing system for a luminance signal, a grayscale smoothing module may, of course, be provided to each of a color difference signal system and a color signal system. Although an 8×8 pixel block has been described as a micro-change detection range, the range is not limited thereto; various design changes may be made, such as a 4×4 pixel block or 16×16 pixel block, or processing modules for various blocks may be combined.

As described above, the present invention is useful for application to image signal processing apparatuses, television signal receiving apparatuses, recording/reproducing apparatuses, set-top boxes, etc.

While certain embodiments of the invention have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:
1. An image signal processing apparatus comprising:
a smoothing module configured to reduce grayscale differences between pixel block units of an input digital image signal, where the grayscale differences are to be detected by using difference information between pixels, and an effect of a smoothing process which rounds the pixels is to be varied according to parameters;

a histogram acquisition module configured to acquire a histogram value of the input digital image signal for one frame;

a histogram value buffer module configured to buffer histogram values for a plurality of frames, the histogram value from the histogram acquisition module being input to the histogram value buffer module;

a luminance level transition detection module configured to detect an interval during which an image gradually changes from light to dark or from dark to light, based on the histogram values for a plurality of frames, and to output a correction parameter during the interval, the correction parameter enhancing an effect of smoothing and reducing the grayscale differences in a plain area; and a correction module configured to provide a parameter to the smoothing module to smooth and reduce the grayscale differences, the parameter being obtained by adding the correction parameter to an initial parameter.

2. The image signal processing apparatus of claim 1, wherein when the histogram acquisition module acquires the histogram value for one frame, the histogram acquisition module multiplies a frequency of each level in a histogram distribution for the one frame by a weighting factor set for each level and uses a sum of resulting frequencies of all levels as the histogram value.

3. The image signal processing apparatus of claim 2, wherein the weighing factor decreases according to a level of luminance in the histogram distribution increases.

4. The image signal processing apparatus of claim 1, wherein the luminance level transition detection module collects a plurality of pieces of information about differences in histogram value between spaced apart frames, to detect the interval during which an image gradually changes from light to dark or from dark to light, and determines to be the interval when there is continuity in positive or negative sign of the information.

5. The image signal processing apparatus of claim 4, wherein when the luminance level transition detection module collects said plurality of pieces of information about differences in histogram value between spaced apart frames, the number of the spaced apart frames is three or more.

6. A method of controlling an image signal processing apparatus, which controls a smoothing module configured to reduce grayscale differences between pixel block units of an input digital image signal, where the grayscale differences are to be detected by using difference information between pixels, and an effect of a smoothing process which rounds the pixels is to be varied according to parameters, the method comprising:

acquiring a histogram value of the input digital image signal for one frame;

taking in the histogram value and buffering histogram values for a plurality of frames;

detecting an interval during which an image gradually changes from light to dark or from dark to light, based on the histogram values for said plurality of frames, and outputting a correction parameter during the interval, the correction parameter enhancing an effect of smoothing and reducing the grayscale differences in a plain area; and providing a parameter to the smoothing module to smooth and reduce the grayscale differences, the parameter being obtained by adding the correction parameter to an initial parameter.

7. A television signal receiving apparatus comprising:

a receiving module which receives a broadcast signal;

a decoder which decodes the received signal and outputs a resulting digital image signal;

a signal processing module which performs predetermined signal processing on the digital image signal;

a display module which displays the image signal processed by the signal processing module; and a control module which performs overall control of signal processing operations, wherein the signal processing module includes:

a smoothing module configured to reduce grayscale differences between pixel block units of the digital image signal, where the grayscale differences are to be detected by using difference information between pixels, and an effect of a smoothing process which rounds the pixels is to be varied according to parameters;

a histogram acquisition module configured to acquire a histogram value of the digital image signal for one frame;

a histogram value buffer module configured to buffer histogram values for a plurality of frames, the histogram value from the histogram acquisition module being input to the histogram value buffer module;

a luminance level transition detection module configured to detect an interval during which an image gradually changes from light to dark or from dark to light, based on the histogram values for said plurality of frames, and to output a correction parameter during the interval, the correction parameter enhancing an effect of smoothing and reducing the grayscale differences in a plain area; and a correction module configured to provide a parameter to the smoothing module to smooth and reduce the grayscale differences, the parameter being obtained by adding the correction parameter to an initial parameter.

* * * * *